United States Patent Office 3,268,793
Patented August 23, 1966

3,268,793
CONTROLLABLE BRIDGE RECTIFIER CIRCUITS
Kenneth G. King and Brian R. Pelly, King's Cross, London, England, assignors to Westinghouse Brake and Signal Company, Limited, London, England
Filed Sept. 27, 1962, Ser. No. 226,523
Claims priority, application Great Britain, Oct. 17, 1961, 37,187/61
6 Claims. (Cl. 321—46)

This invention relates to controllable bridge rectifier circuits and relates particularly to bridge rectifier circuits employing controllable rectifiers for feeding an inductive load.

According to the present invention there is provided a controllable bridge rectifier circuit in which a unidirectional current path is provided which is alternative to the path through one or more controllable rectifiers in the bridge circuit for current which flows in an inductive load when control signals to one or more controllable rectifiers in the bridge circuit are interrupted and means is provided for providing a potential to tend to counteract the flow of such current in the bridge circuit.

Preferably said unidirectional current path comprises a rectifier device connected between the load terminals, so poled as to be non-conducting for current flowing from the rectifier bridge circuit.

In order that the invention may be clearly understood and readily carried into effect the same will now be described by way of example only, with reference to the accompanying drawings.

Figure 1:
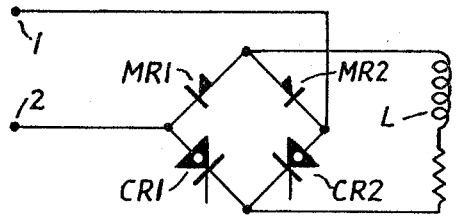
FIGURE 1 illustrates one form of controllable rectifier bridge circuit to which the invention can be applied.

Referring to the basic single phase controllable bridge rectifier circuit shown in FIGURE 1, this circuit comprises two metal rectifiers, MR1 and MR2 connected between A.C. supply terminals 1 and 2 with opposite polarities and similarly a pair of controllable rectifier devices CR1 and CR2 also connected between the A.C. supply terminals 1 and 2. The junction of CR1 and CR2 is connected to one terminal and the junction of MR1 and MR2 is connected to the other terminal of the load L. For the purposes of the present description it is assumed that the load L is at least partially inductive as indicated. The controllable rectifier devices CR1 and CR2 consist of rectifier devices of the type which are rendered conducting only on the application of triggering control signals to the gate electrodes thereof and which are subsequently only rendered non-conducting when the current carried thereby falls below a predetermined minimum sustaining value. By varying the instants during respective half-cycles when triggering control signals are applied to CR1 and CR2, the mean D.C. output level is controlled. With control pulses applied in alternate half cycles to the rectifier CR1 and in intervening half cycles to CR2, each of these conducts for a full 180° for all triggering angles, assuming the load to be sufficiently inductive. If the supply of control signals is interrupted at any instant, one controlled rectifier or the other is always conducting at that instant and therefore if CR1 is conducting for example at such an instant, current continues to flow from the supply through the load L and MR2 if terminal 2 of the supply is assumed to be positive with respect to terminal 1, due to the inductance of the load or through MR1 and CR2 if terminal 1 is positive. CR1 is then still conducting when terminal 2 next becomes positive and current flows from the supply to the load L again in the same manner as if CR1 had been rendered conducting by a control pulse. This process continues as long as the control signals to the rectifiers remain interrupted. Hence, under these conditions the whole of every other half cycle of the supply voltage is applied to the load and the circuit acts as a half wave rectifier and the output voltage of the bridge is fixed at half the maximum voltage the load current flowing continuously through only one controlled rectifier. Control of the circuit is therefore substantially lost and over loading of certain parts of the circuit may result.

The above effect may also be experienced with a three-phase controllable rectifier bridge having three controlled arms and three uncontrolled arms, feeding an inductive load.

Figure 2:
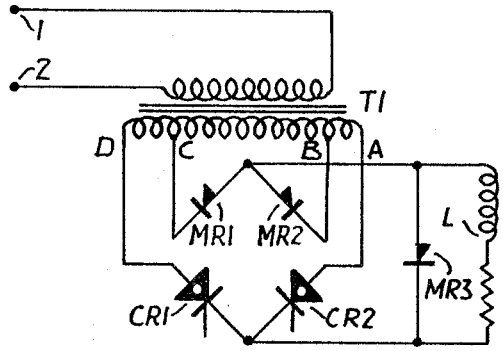
FIGURE 2 illustrates one manner in which the invention can be applied to the circuit shown in FIGURE 1.

Referring to FIGURE 2 the above disadvantages are substantially reduced by connecting a unidirectional conductive current path in the form of a rectifier MR3 across the load terminals. This forms a current path alternative to the controllable rectifiers in the bridge circuit, for current in the inductive load when control signals are interrupted as envisaged above. Thus, taking the case envisaged in which the current tends to continue to flow through CR1 and MR1 as a result of CR2 not being rendered conducting instead of flowing through MR1 and CR2, the current due to the inductive load tends to flow through MR3 and therefore CR1 may become non-conducting at the correct instant. It may however be that MR3 does not take the whole of the current which on failure of CR2 to be rendered conducting is carried by MR1 and CR1. Therefore CR1 may, in spite of the presence of MR3, continue to conduct. To overcome this the bridge circuit is fed from a transformer T1 the primary winding of which is connected to the alternating current supply and the secondary winding of which is provided with two tappings A and D one at either end and two tappings B and C somewhat displaced from the ends. The junctions of MR1 and CR1 is broken and MR1 is connected to the tapping point C and CR1 is connected to the tapping point D as shown. Similarly, the junction point of MR2 and CR2 is broken, MR2 being connected to the point B and CR2 being connected to the point A on the secondary of T1. In this way a tendency for current to flow through CR1 or CR2 due to the effect of the inductive load is counteracted by the provision of the reversed potential developed across the section of secondary winding between tappings C and D or A and B, as the case may be and therefore all the load current is passed through MR3 in the half cycle under consideration.

Figure 3:
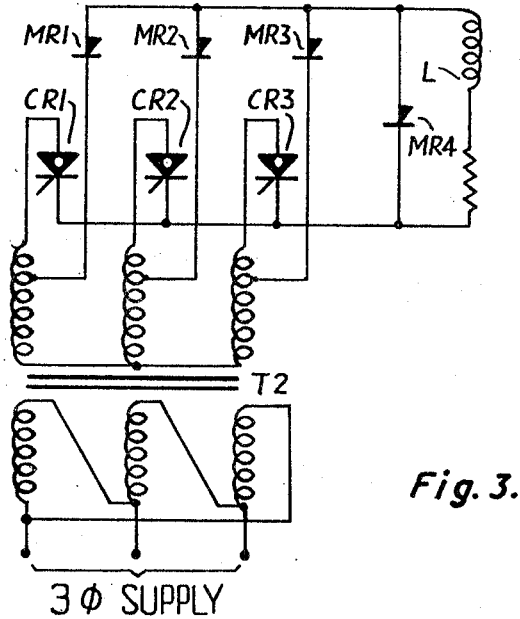
FIGURE 3 illustrates a three-phase controllable rectifier bridge circuit according to a further example of the invention.

The circuit arrangement shown in FIGURE 3 shows a three-phase controllable rectifier bridge to which the invention has been applied. The arms of the bridge comprise metal rectifiers MR1, MR2 and MR3 and controllable rectifiers CR1, CR2 and CR3. The arms have common terminals connected to the terminals of the load L which is shown as inductive as in FIGURES 1 and 2, and the other terminals are connected respectively to the secondary windings of a three-phase input transformer T2, the primary windings of which are connected as shown to a three-phase supply not shown.

As in the case of FIGURE 2, the controllable rectifier devices in FIGURE 3 are devices of a type which is rendered conducting on application of triggering signals thereto and is subsequently rendered non-conducting when the current therein gets too low. The mean direct current output level of the controllable rectifier bridge arrangement of FIGURE 3 is therefore variable by advancing and retarding the instants of application of triggering signals to the respective controllable rectifier devices during the half cycles when each is supplied with forward voltage. The form of circuit for applying these triggering signals to the bridge arrangement forms no part of the present invention and is therefore not described herein.

Considering the state of affairs when the supply of triggering signals to the controllable rectifier devices is cut off and assuming that CR1 is conducting at this instant, there is due to the inductance of the load a tendency for load current to continue to flow via MR1 and CR1. However similarly to FIGURE 2, a diode is connected across the load to form a bypass for the path through the bridge for this current and MR1, MR2, MR3 are connected to tappings on the respective secondary windings of T2. In the present instance of CR1 remaining conducting there is developed between the anode of CR1 and the cathode of MR1 reverse biasing CR1 and ensuring that the inductive load current flows via MR4. CR1 therefore becomes non-conducting. The same is true of the state of affairs when CR2 or CR3 is the last to receive a triggering signal prior to cessation of triggering signals to the controllable bridge rectifier arrangement.

In the circuit arrangements shown in FIGURES 2 and 3 the rectifier device MR3 or MR4, as the case may be, may have to be rated to carry a circulating current which is nearly equal to the full current rating of the rectifier bridge, to accommodate the case of a highly inductive load carrying full current with a retarded triggering angle. This may be avoided in a three-phase arrangement by arranging the small voltage introduced between the opposite arms of the bridge to have a more suitable phase relationship to the supply voltage so that under normal operating conditions most of the circulating current is carried by the bridge circuit itself rather than by the alternative current path, namely the rectifier MR4. This can be achieved by replacing the overwinds shown in FIGURE 3 by a small winding disposed on appropriate limbs of the transformer T2.

Although the invention has been described solely in relation to single phase or three-phase supply arrangements the invention may equally well be applied to circuits employing a larger number of phases. Furthermore, no disclosure has been made herein of the driver circuits for producing the triggering signals for the controllable rectifiers such circuits are well known in the art and form no part of the present invention.

Having thus described our invention what we claim is:

1. In a controllable bridge rectifier circuit, a bridge including two pairs of rectifying arms, means for connecting said bridge to a source of alternating current, an inductive load connected to said bridge, one arm of each pair including controllable rectifier means requiring a trigger signal to be rendered conductive and remaining conductive so long as the current therein exceeds a predetermined value, a unidirectional current path alternative to any path through a said controllable rectifier device in said bridge for current tending to flow due to the inductance of said load, and means for introducing a voltage tending to oppose the continued flow of such last mentioned current in a said controllable rectifier means following cessation of trigger signals thereto, whereby to ensure that said controllable rectifier means become non-conductive before a forward voltage is again applied thereto from a said source.

2. A controllable bridge rectifier circuit as claimed in claim 1, wherein said unidirectional current path comprises a rectifier device connected between load terminals for the bridge and so poled as to be non-conducting for current flowing from the rectifier bridge to the load.

3. A controllable bridge rectifier circuit as claimed in claim 1 wherein said means for introducing an opposing voltage comprises means for injecting an appropriately poled fraction of the A.C. supply in series with at least that controllable rectifier means which tends to continue to conduct.

4. A polyphase controllable bridge rectifier circuit as claimed in claim 3 wherein said means for applying an opposing potential comprises means for injecting a phase displaced fraction of the supply in series with at least the controllable rectifier means which tend to continue to conduct.

5. A circuit as set forth in claim 3, said means for connecting said bridge to a source of alternating current comprising a transformer having a primary winding for connection to the source and a secondary winding, said means for injecting an appropriately poled fraction of the A.C. supply including a portion of the secondary of said transformer.

6. A circuit as set forth in claim 1, and intended for connection to a polyphase current source, said means for connecting said bridge to a source of alternating current comprising a polyphase transformer, having a secondary with plural sections, said means for introducing a said voltage tending to oppose said continued current flow comprising connecting means between respective said transformer secondary sections and each said arm including a said controllable rectifier means.

References Cited by the Examiner

G.E., "Controlled Rectifier Manual," first edition, copyright March 20, 1960 (pp. 151–153).

JOHN F. COUCH, *Primary Examiner.*

LLOYD McCOLLUM, *Examiner.*

A. J. GAJARSA, W. SHOOP, *Assistant Examiners.*